United States Patent
Bogdanski et al.

(10) Patent No.: US 9,231,888 B2
(45) Date of Patent: Jan. 5, 2016

(54) SYSTEM AND METHOD FOR ROUTING TRAFFIC BETWEEN DISTINCT INFINIBAND SUBNETS BASED ON SOURCE ROUTING

(71) Applicant: Oracle International Corporation, Redwood Shores, CA (US)

(72) Inventors: Bartosz Bogdanski, Oslo (NO); Bjørn Dag Johnsen, Oslo (NO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 107 days.

(21) Appl. No.: 13/889,088

(22) Filed: May 7, 2013

(65) Prior Publication Data

US 2013/0301645 A1 Nov. 14, 2013

Related U.S. Application Data (60) Provisional application No. 61/646,107, filed on May 11, 2012.

(51) Int. Cl.
| | |
|---|---|
| H04L 12/58 | (2006.01) |
| H04L 12/937 | (2013.01) |
| H04L 12/721 | (2013.01) |
| H04L 12/707 | (2013.01) |
| H04L 12/931 | (2013.01) |
| G06F 9/44 | (2006.01) |
| H04L 29/12 | (2006.01) |

(52) U.S. Cl.
CPC ............ *H04L 49/253* (2013.01); *G06F 9/4443* (2013.01); *H04L 29/12* (2013.01); *H04L 45/24* (2013.01); *H04L 45/44* (2013.01); *H04L 49/35* (2013.01); *H04L 49/358* (2013.01)

(58) Field of Classification Search
CPC ........ H04L 45/00; H04L 12/58; G06F 15/173
USPC ........................................... 370/401; 709/238
See application file for complete search history.

(56) References Cited

U.S. PATENT DOCUMENTS

| | | | |
|---|---|---|---|
| 7,318,151 | B1 | 1/2008 | Harris |
| 7,398,394 | B1 | 7/2008 | Johnsen et al. |
| 7,401,157 | B2 | 7/2008 | Costatino et al. |
| 7,746,872 | B2 * | 6/2010 | Norden .................. 370/396 |
| 7,936,753 | B1 * | 5/2011 | Colloff et al. ............ 370/390 |
| 7,975,147 | B1 | 7/2011 | Qumei |
| 8,175,107 | B1 | 5/2012 | Yalagandula et al. |
| 8,234,407 | B2 | 7/2012 | Sugumar |

(Continued)

OTHER PUBLICATIONS

International Search Report dated Aug. 12, 2013 for Application No. PCT/US2013/040210, 10 pages.

(Continued)

*Primary Examiner* — Khaled Kassim
*Assistant Examiner* — Berhanu Belete
(74) *Attorney, Agent, or Firm* — Tucker Ellis LLP (57) ABSTRACT

A system and method can rout traffic between distinct subnets in a network environment. A router that connects the distinct subnets, such as InfiniBand (IB) subnets, can receive a list of destinations that the router is responsible for routing one or more packets to. Then, the router can generate a random number based on a source local identifier (LID) and a destination LID associated with the one or more packets, and use a modulo based hash to select one router port from a plurality of output router ports of the router.

20 Claims, 10 Drawing Sheets

(56) References Cited

U.S. PATENT DOCUMENTS

| | | | |
|---|---|---|---|
| 8,484,353 B1 | 7/2013 | Johnson et al. | |
| 8,924,952 B1 | 12/2014 | Hou | |
| 8,972,966 B2 | 3/2015 | Kelso | |
| 2004/0022245 A1* | 2/2004 | Forbes et al. | 370/392 |
| 2004/0022257 A1 | 2/2004 | Green | |
| 2004/0024903 A1* | 2/2004 | Costatino et al. | 709/238 |
| 2004/0031052 A1 | 2/2004 | Wannamaker | |
| 2004/0162973 A1 | 8/2004 | Rothman | |
| 2004/0193768 A1 | 9/2004 | Carnevale | |
| 2004/0199764 A1 | 10/2004 | Koechling et al. | |
| 2004/0205253 A1 | 10/2004 | Arndt | |
| 2004/0255286 A1 | 12/2004 | Rothman | |
| 2005/0018669 A1* | 1/2005 | Arndt et al. | 370/389 |
| 2005/0182701 A1 | 8/2005 | Cheston | |
| 2006/0168339 A1 | 7/2006 | Shapiro et al. | |
| 2007/0016694 A1 | 1/2007 | Achler | |
| 2007/0050763 A1 | 3/2007 | Kagan | |
| 2007/0129917 A1 | 6/2007 | Blevins et al. | |
| 2008/0186853 A1* | 8/2008 | Archer et al. | 370/235 |
| 2008/0186990 A1* | 8/2008 | Abali et al. | 370/419 |
| 2008/0192750 A1 | 8/2008 | Ko et al. | |
| 2008/0219237 A1 | 9/2008 | Thubert | |
| 2008/0285562 A1* | 11/2008 | Scott et al. | 370/392 |
| 2008/0320117 A1 | 12/2008 | Johnsen et al. | |
| 2009/0059913 A1 | 3/2009 | Duato | |
| 2009/0178033 A1 | 7/2009 | Challener | |
| 2009/0216853 A1* | 8/2009 | Burrow et al. | 709/208 |
| 2009/0307499 A1 | 12/2009 | Senda | |
| 2010/0008222 A1 | 1/2010 | Le Roux et al. | |
| 2010/0020806 A1 | 1/2010 | Vahdat | |
| 2010/0054117 A1* | 3/2010 | Southworth et al. | 370/216 |
| 2011/0075673 A1 | 3/2011 | Hardie | |
| 2011/0090789 A1* | 4/2011 | Fung | 370/230 |
| 2011/0138082 A1 | 6/2011 | Khatri | |
| 2011/0138185 A1 | 6/2011 | Ju et al. | |
| 2012/0005480 A1 | 1/2012 | Batke et al. | |
| 2012/0084420 A1 | 4/2012 | Ayanam et al. | |
| 2012/0093023 A1* | 4/2012 | Ficet et al. | 370/252 |
| 2012/0151223 A1 | 6/2012 | Conde Marques et al. | |
| 2012/0239928 A1 | 9/2012 | Judell | |
| 2012/0311332 A1 | 12/2012 | Johnsen et al. | |
| 2012/0311682 A1 | 12/2012 | Johnsen et al. | |
| 2013/0003976 A1 | 1/2013 | An et al. | |
| 2013/0046904 A1 | 2/2013 | Hilland | |
| 2013/0179870 A1 | 7/2013 | Kelso | |
| 2013/0191622 A1 | 7/2013 | Sasaki | |
| 2013/0259033 A1 | 10/2013 | Hefty | |
| 2014/0095853 A1 | 4/2014 | Sarangshar | |
| 2014/0095876 A1 | 4/2014 | Smith et al. | |
| 2014/0101653 A1 | 4/2014 | Dharmadhikari et al. | |

OTHER PUBLICATIONS

Mellanox Technologies, Inc., "Introduction to InfiniBand™" Rev 1.90, retrieved Jan. 12, 2015 <http://www.mellanox.com/pdf/whitepapers/IB_Intro_WP_190.pdf>, 20 pages.

Zhuo, Haihong et al., "Remote Management with the Baseboard Management Controller in Eighth-Generation Dell PowerEdge Servers", Oct. 2004, retrieved Jan. 12, 2015, <http://www.dell.com/downloads/global/power/ps4q04-20040110-zhuo.pdf>, pp. 26-29.

Vishnu, et al., Performance Modeling of Subnet Management on Fat Tree InfiniBand Networks Using OpenSm, 19th IEEE International, Apr. 4, 2005, 9 pages, Parallel and Distributed Processing Symposium, Denver, CO, USA. Relevant pages: paragraph 2. Background; paragraph 3. Subnet Management Mechanism.

Bogdanski, et al., sFtree: A Fully Connected and Deadlocked-Free Switch-to-Switch Routing Algorithm for Fat-Trees; ACM Transactions on Architecture and Code Optimization, Jan. 2012, vol. 8, No. 4, New York, NY, USA. Relevant pages: paragraph 2, The Infiniband Architecture; paragraph 3, Fat-Tree Routing.

Unknown Author, Local Area Network (LAN) Emulation over InfiniBand, IP.com Journal, Sep. 18, 2003, 1 page, West Henrietta, NY, USA. Relevant pages: Whole document.

International Searching Authority, International Search Report and Written Opinion for PCT International Patent Application No. PCT/US2013/040212, Aug. 8, 2013, 12 pages.

European Patent Office, International Searching Authority, International Search Report and Written Opinion dated Mar. 25, 2015 for International Application No. PCTUS2014059949, 12 pages.

Mellanox Technologies, "Boot over IB (BoIB) User's Manual Rev 1.0", © copyright 2008, 28 pages, retrieved Apr. 7, 2015 from: <http://www.mellanox.com/pdf/BoIB/Boot-over-IB_User_Manual_1_0.pdf>.

Mellanox Technologies, "InfiniScale® IV 8-Port QSFP 40 Gb/s InfiniBand Switch User Manual Rev 1.4", © copyright 2012, 55 pages, retrieved Apr. 7, 2015 from: <http://www.mellanox.com/related-docs/user_manuals/IS5022_User_Manual.pdf>.

Tom Shanley, Infiniband Network Architecture (excerpt), Pearson Education, Published 2002, p. 213.

* cited by examiner

SYSTEM AND METHOD FOR ROUTING TRAFFIC BETWEEN DISTINCT INFINIBAND SUBNETS BASED ON SOURCE ROUTING

CLAIM OF PRIORITY

This application claims priority on U.S. Provisional Patent Application No. 61/646,107, entitled "SYSTEM AND METHOD FOR ROUTING TRAFFIC BETWEEN DISTINCT INFINIBAND SUBNETS" filed May 11, 2012, which application is herein incorporated by reference.

CROSS-REFERENCE TO RELATED APPLICATIONS

This application is related to the following patent application, which is hereby incorporated by reference in its entirety:

U.S. patent application Ser. No. 13/889,123 filed May 7, 2013 entitled "SYSTEM AND METHOD FOR ROUTING TRAFFIC BETWEEN DISTINCT INFINIBAND SUBNETS BASED ON FAT-TREE ROUTING."

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to a middleware machine environment.

BACKGROUND

As larger cloud computing architectures are introduced, the performance and administrative bottlenecks associated with the traditional network and storage have become a significant problem. The InfiniBand (IB) technology has seen increased deployment as the foundation for a cloud computing fabric. This is the general area that embodiments of the invention are intended to address.

SUMMARY

Described herein is a system and method that can rout traffic between distinct InfiniBand (IB) subnets. A router that connects the distinct subnets, such as InfiniBand (IB) subnets, can receive a list of destinations that the router is responsible for routing one or more packets to. Then, the router can generate a random number based on a source local identifier (LID) and a destination LID associated with the one or more packets, and use a modulo based hash to select one router port from a plurality of output router ports of the router.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the InfiniBand (IB) network as an example for a high performance network. It will be apparent to those skilled in the art that other types of high performance networks can be used without limitation. Also, the description of the invention as following uses the fat-tree as an example for a network topology model. It will be apparent to those skilled in the art that other types of network topology models can be used without limitation.

Described herein are systems and methods that can support routing traffic in between distinct networks.

InfiniBand (IB) Architecture

The IB Architecture is a serial point-to-point full-duplex technology. As IB clusters grow in size and complexity, the network can be segmented into manageable sections, which can be referred to as subnets. An IB subnet can include a set of hosts interconnected using switches and point to point links. An IB subnet can also include at least one subnet manager (SM), which is responsible for initializing and bringing up the network, including the configuration of all the switches, routers and host channel adapters (HCAs) in the subnet.

IB supports a rich set of transport services in order to provide both remote direct memory access (RDMA) and traditional send/receive semantics. Independent of the transport service used, the IB HCAs communicate using queue pairs (QPs). A QP is created during the communication setup, and can have a set of initial attributes such as QP number, HCA port, destination LID, queue sizes, and transport service that are supplied. An HCA can handle many QPs, each QP consists of a pair of queues, such as a send queue (SQ) and a receive queue (RQ), and there is one such pair present at each end-node participating in the communication. The send queue holds work requests to be transferred to the remote node, while the receive queue holds information on what to do with the data received from the remote node. In addition to the QPs, each HCA has one or more completion queues (CQs) that are associated with a set of send and receive queues. The CQ holds completion notifications for the work requests posted to the send and receive queue. Even though the complexities of the communication are hidden from the user, the QP state information is kept in the HCA.

Routing Traffic Between Distinct InfiniBand (IB) Subnets

Figure 1:
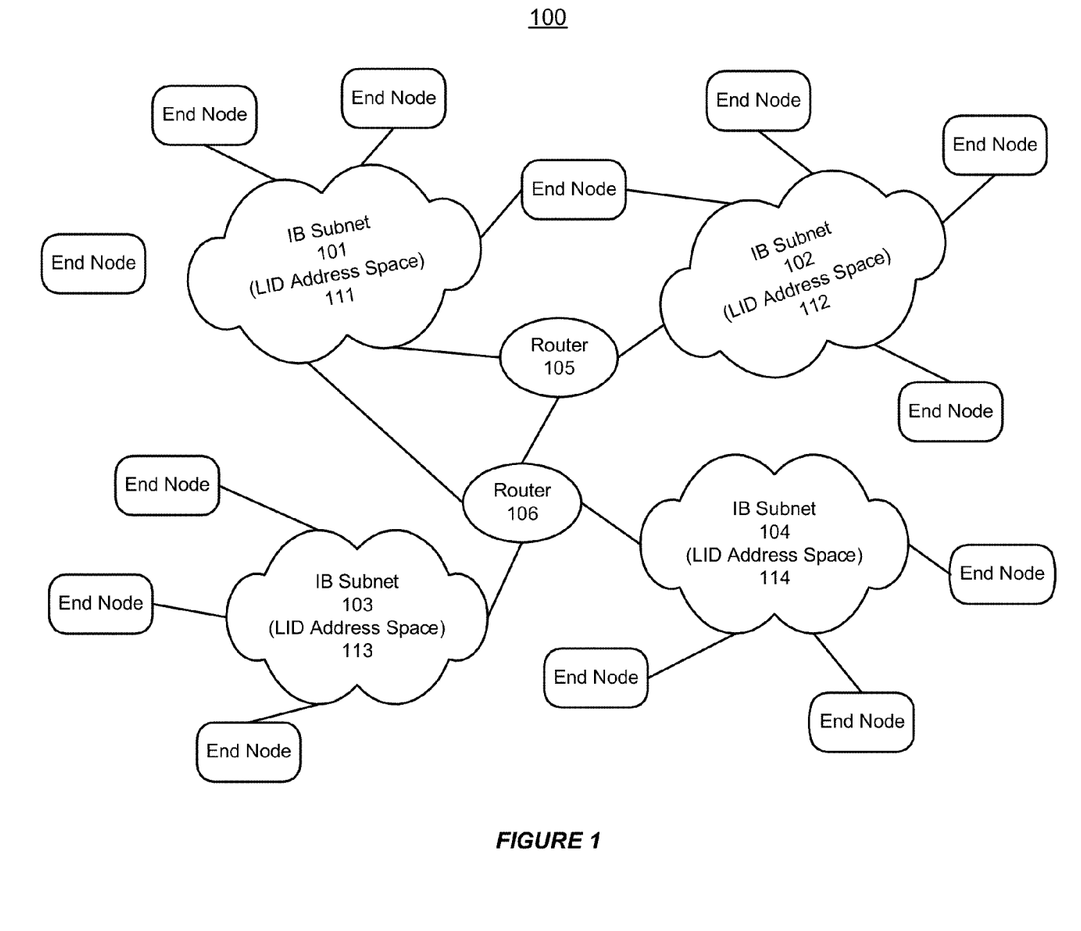
FIG. 1 shows an illustration of routing traffic between distinct InfiniBand (IB) subnets in a network environment, in accordance with an embodiment of the invention.

FIG. 1 shows an illustration of routing traffic between distinct InfiniBand (IB) subnets in a network environment, in accordance with an embodiment of the invention. As shown in FIG. 1, a network environment 100 can be based on the InfiniBand Architecture (IBA), and supports a two-layer topological division.

The lower layer of the IB network, or IB fabric 100, can be referred to as subnets, e.g. subnets 101-104, each of which includes a set of hosts interconnected using switches and point-to-point links. At the higher level, the one or more subnets 101-104 in an IB fabric 100 can be interconnected using routers, e.g. routers 105-106. Furthermore, each subnet 101-104 can run its own subnet manager (SM) that configures only the ports on the local subnet and the routers 105-106 are non-transparent to the subnet managers (SM).

The hosts and switches within each of the subnets 101-104 can be addressed using the designated local identifiers (LIDs). The size of the large installations may be limited by the number of available local identifiers (LIDs). For example, a single subnet may be limited to 49151 unicast LIDs. One approach to expand the IB address space is expanding the LID addressing space to 32 bits, the usability of which can be limited since this approach may not be backward compatible with older hardware.

In accordance with an embodiment of the invention, the IB routers 105-106 can provide address space scalability in the IB fabric 100. As shown in FIG. 1, when more end-ports are desired, multiple subnets 101-104 can be combined together using one or more IB routers 105-106. Each of the subnets 101-104 can use a local identifier (LID) address space 111-114. Since LID addresses have local visibility within each LID address space 111-114, the LID addresses can be reused in the different subnets 101-104 connected by routers 105-106. Thus, address space scalability can be provided for the IB fabric 100, and this approach can theoretically yield an unlimited addressing space.

Furthermore, by segmenting a large and complex network 100 into multiple subnets 101-104, the system can provide fabric management containment. The fabric management containment can be beneficial in providing: 1) fault isolation, 2) increased security, and 3) intra-subnet routing flexibility.

First, by dividing a large network 100 into several smaller subnets 101-104, faults or topology changes can be contained to a single subnet, and the subnet reconfiguration may not pass through the routers 105-106 to other subnets. This shortens the reconfiguration time and limits the impact of a fault.

Second, from a security point of view, segmenting a large fabric 100 into subnets 101-104 using routers 105-106 limits the scope of most attacks to the attacked subnet.

Third, from a routing point of view, fabric management containment can be beneficial in supporting more flexible routing schemes, which can be particularly advantageous in case of a hybrid fabric that comprises two or more regular topologies.

For example, a hybrid fabric 100 may include a fat-tree part interconnected with a mesh or a torus part (or any other regular topology). There may be no straightforward way to route the different parts of the hybrid fabric 100 separately, because the intra-subnet routing algorithms can only have a subnet scope. Moreover, there are no general purpose agnostic routing algorithms for IB that can provide optimal performance for a hybrid topology.

In accordance with an embodiment of the invention, the hybrid topology can be divided into smaller regular subnets 101-104, each of which can be routed using a different routing algorithm that is optimized for a particular subnet. For example, a fat-tree routing algorithm can route the fat-tree part and the dimension-order routing can route the mesh part of the topology.

Furthermore, a super subnet manager can be used to coordinate between the local subnet managers and can establish the path through the transit subnet, in the case of more irregular networks where the final destination is located behind another subnet (e.g. at least two router hops required).

Thus, by using routing between IB subnets, the system can provide address space scalability and fabric management containment in an IB network.

Native InfiniBand (IB) Routers

Figure 2:
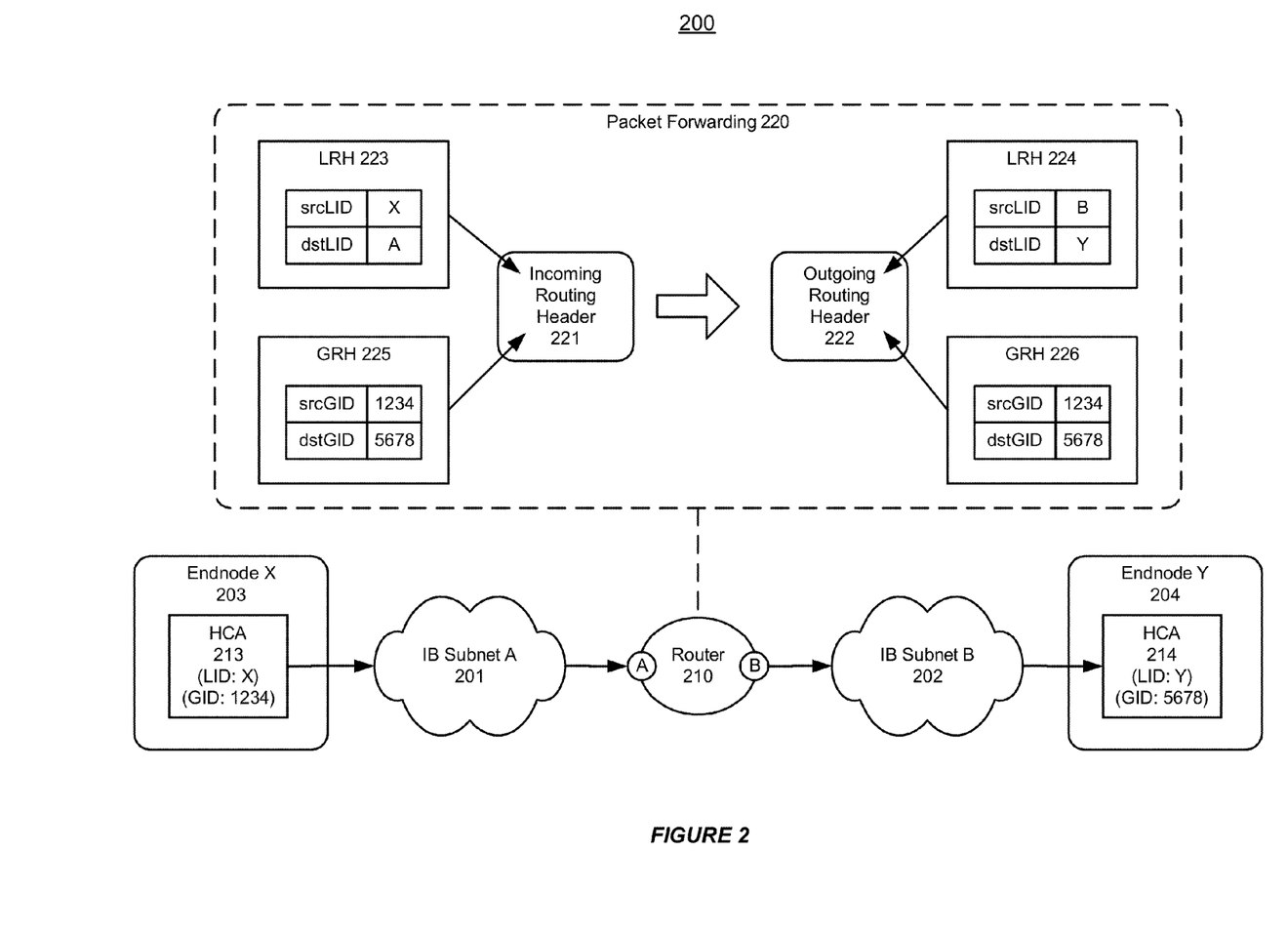
FIG. 2 shows an illustration of supporting packet forwarding on a router in a network environment, in accordance with an embodiment of the invention.

FIG. 2 shows an illustration of supporting packet forwarding on a router in a network environment, in accordance with an embodiment of the invention. As shown in FIG. 2, the network environment 200 can include multiple subnets, e.g. IB subnets A-B 201-202, that are interconnected using a router 210. Furthermore, the IB subnet A 201 connects to an end node X 203, which is associated with host channel adapter (HCA) 213, and the IB subnet B 202 connects to an end node Y 204, which is associated with host channel adapter (HCA) 214.

In accordance with an embodiment of the invention, the IB router 210 can operate at layer-3 of the IB addressing hierarchy. Furthermore, in addition to LIDs, each IB device may also have a 64-bit global unique identifier (GUID), which can be used to form a GID, an IB layer-3 address. For example, a GID can be created by concatenating a 64-bit subnet ID with the 64-bit GUID to form an IPv6-like 128-bit address. Additionally, the term GUID may be also used to refer to a port GUIDs, i.e. the GUIDs assigned to every port in the IB fabric, and the GUID can be burned into the non-volatile memory.

As shown in FIG. 2, an end-node, e.g. end node X 203, can send a packet to another end-node, e.g. end node Y 204, via the router 210. The address resolution mechanism can make the local router 210 visible to the end nodes X-Y 203-204.

For example, the packet received at the router 210 can include an incoming routing header 221, which includes a local routing header (LRH) 223 and a global routing header (GRH) 225. Before forwarding the packet, the router 210 can modify the incoming routing header 221 into an outgoing routing header 222, which includes a LRH 224 and a GRH 226.

As shown in FIG. 2, the end-node X 203 can put the local HCA's LID address, e.g. X, as the source LID, srcLID, and put the local router's LID address, e.g. A, as the destination LID, dstLID, in the LRH 223. Furthermore, the end-node X 203 can put its layer-3 address (GID), e.g. 1234, as the source GID, srcGID, and can put the final destination address (GID), e.g. 5678, as the destination GID, dstGID, in the GRH 225.

When the packet reaches at the router 210, a packet forwarding mechanism 220 can update and replace the packet fields. For example, the system can replace the source LID, srcLID, in the local routing header (LRH) 224 with the LID of the router's egress port, e.g. B. Furthermore, the system can replace the destination LID, dstLID, with the LID address of the destination, e.g. Y.

Alternatively, the system can use the LID of the egress port of the previous-hop router as the source LID, srcLID, if the packet is forwarded in from another router. Also, the system can replace the destination LID, dstLID, with the LID of the next-hop port, if further packet forwarding is necessary. In each case, the system can recompute the cyclic redundancy checks (CRCs) before forwarding the packet to the next hop.

In accordance with an embodiment of the invention, different methods can be used for routing traffic between distinct InfiniBand (IB) subnets. These methods can be used to answer various problems with inter-subnet routing, such as which router should be chosen for a particular destination (first routing phase) and which path should be chosen by the router to reach the destination (second routing phase).

For example, these methods can include a simple classic routing method, a source routing method that provides good performance for various topologies, and an optimized routing method that is specialized and provides optimal performance for fat-tree based topologies. Both the source routing method and the optimized routing method can potentially deliver better performance than the classic routing method. Furthermore, the optimized routing method allows for obtaining the optimal performance for an underlying fat-tree topology. Additionally, both methods support the use of arbitrary multi-port routers, whereas the classic routing may not utilize all the ports effectively, even when it does not restrict the number of available ports.

Thus, using these methods, the native IB routers allow building more complex IB fabrics by connecting subnets together without a significant decrease in performance.

Inter-Subnet Source Routing (ISSR)

In accordance with an embodiment of the invention, a general purpose routing algorithm, such as the inter-subnet source routing (ISSR) routing algorithm, can be used for routing complex network with hybrid subnets. The ISSR routing algorithm can include two phases, a first phase for choosing an ingress router port for a particular destination, and a second phase for selecting an egress router port.

Figure 3:
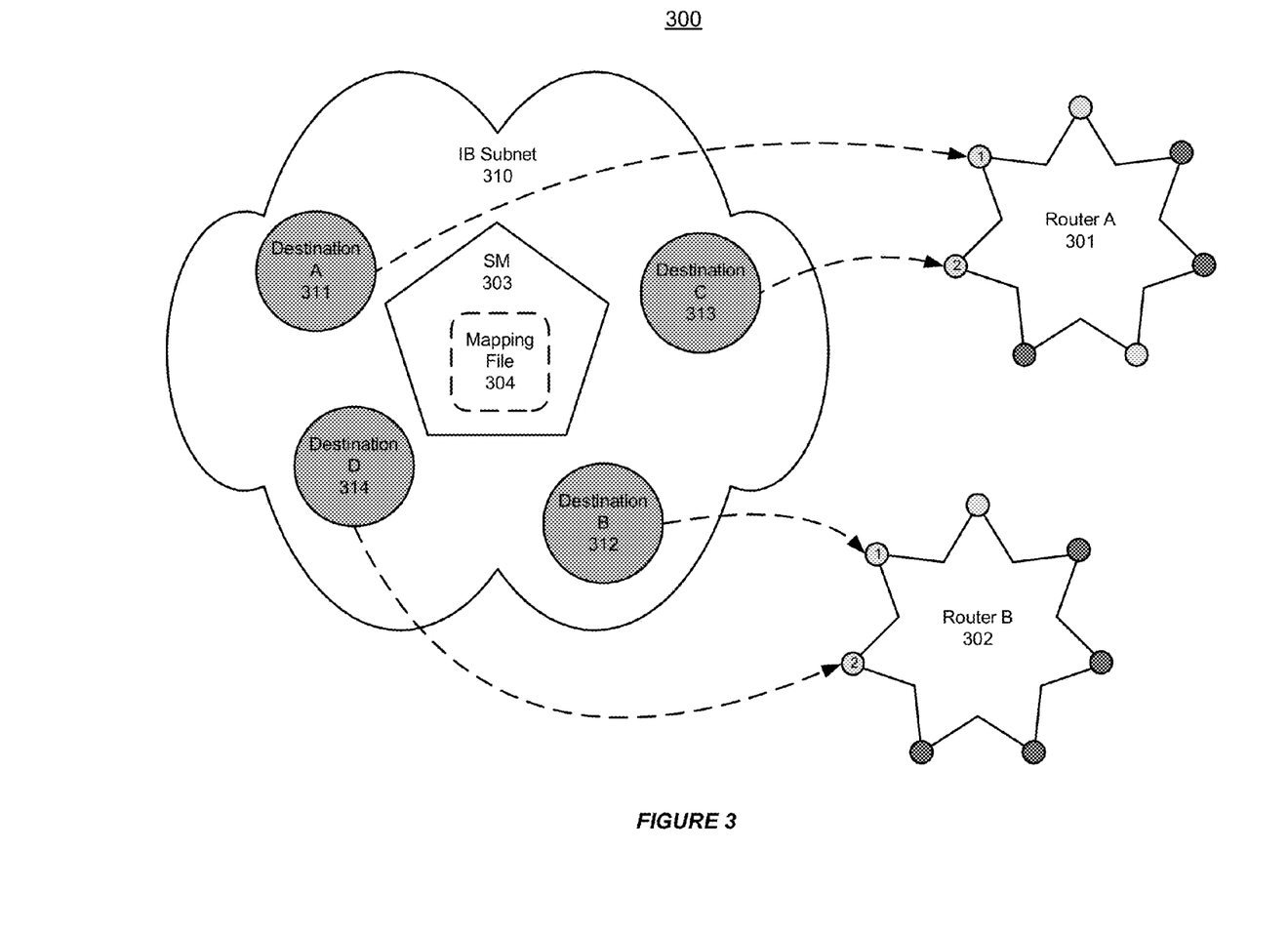
FIG. 3 shows an illustration of choosing ingress router ports for different destinations in a network environment, in accordance with an embodiment of the invention.

FIG. 3 shows an illustration of choosing ingress router ports for different destinations in a network environment, in accordance with an embodiment of the invention. As shown in FIG. 3, a network environment 300 can include a subnet 310 that is connected with one or more routers, e.g. router A 301 and router B 302.

A subnet manager (SM), e.g. SM 303 in the subnet 310, can include a mapping file 304, which can be used to choose ingress router ports for different destinations. Furthermore, the choosing of an ingress router port can be based on round-robin path distribution among all available routers that are connected to the local subnet. For example, the find_router( ) function, which chooses the local router port for the ISSR algorithm, can be implemented in a way similar to the OpenSM routing algorithm.

The following is a high-level example of a mapping file 304.

TABLE 1

A high-level example of a mapping file for ISSR and ISFR algorithms

| | | |
|---|---|---|
| 1: | dst_gid1 | router A port 1 guid |
| 2: | dst_gid2 | router B port 1 guid |
| 3: | dst_gid3 | router A port 2 guid |
| 4: | dst_gid4 | router B port 2 guid |
| 5: | #default route | |
| 6: | * | router A port 1 guid |
| 7: | * | router B port 1 guid |

Unlike OpenSM routing, which can only match a whole subnet to a single router port, the system can map the destination end-ports to different router ports. Furthermore, the setup of the mapping file can be different from the mapping file provided in the OpenSM. As shown in the above Table 1, the mapping file 304 contains a fully qualified port GID, instead of only a subnet prefix as for the OpenSM inter-subnet routing, which allows the system to provide full granularity in choosing ingress router ports.

Furthermore, as shown in FIG. 3, an equal (or similar) number of destinations can be mapped to a number of ports, e.g. in a round robin manner. For example, destination A 311 (dst_gid1) and destination C 313 (dst_gid3) can be routed through port 1 and port 2 on router A 301, and destination B 312 (dst_gid2) and destination D 314 (dst_gid4) can be routed through port 1 and port 2 on router B 302. Additionally, the mapping file 304 can specify backup and default routes.

In accordance with an embodiment of the invention, the selecting an egress router port can be implemented using a modulo based hash in the router firmware. The hash can take a random number generated using the source and destination LIDs (or any other useful parameter such as the ingress port number on the router). Using the hash, one of the output router ports can be selected. Furthermore, the ISSR routing algorithm is a deterministic oblivious routing algorithm that always uses the same path for the same pair of nodes.

Furthermore, a two-step port verification method can be used to select the egress router port, since a router may be attached to more than two subnets. First, the system can choose a set of possible ports that are attached to the subnet (or in the direction of the subnet) in which the destination is located. Then, the system can use a simple hash based on a modulo function to choose the egress port.

Figure 4:
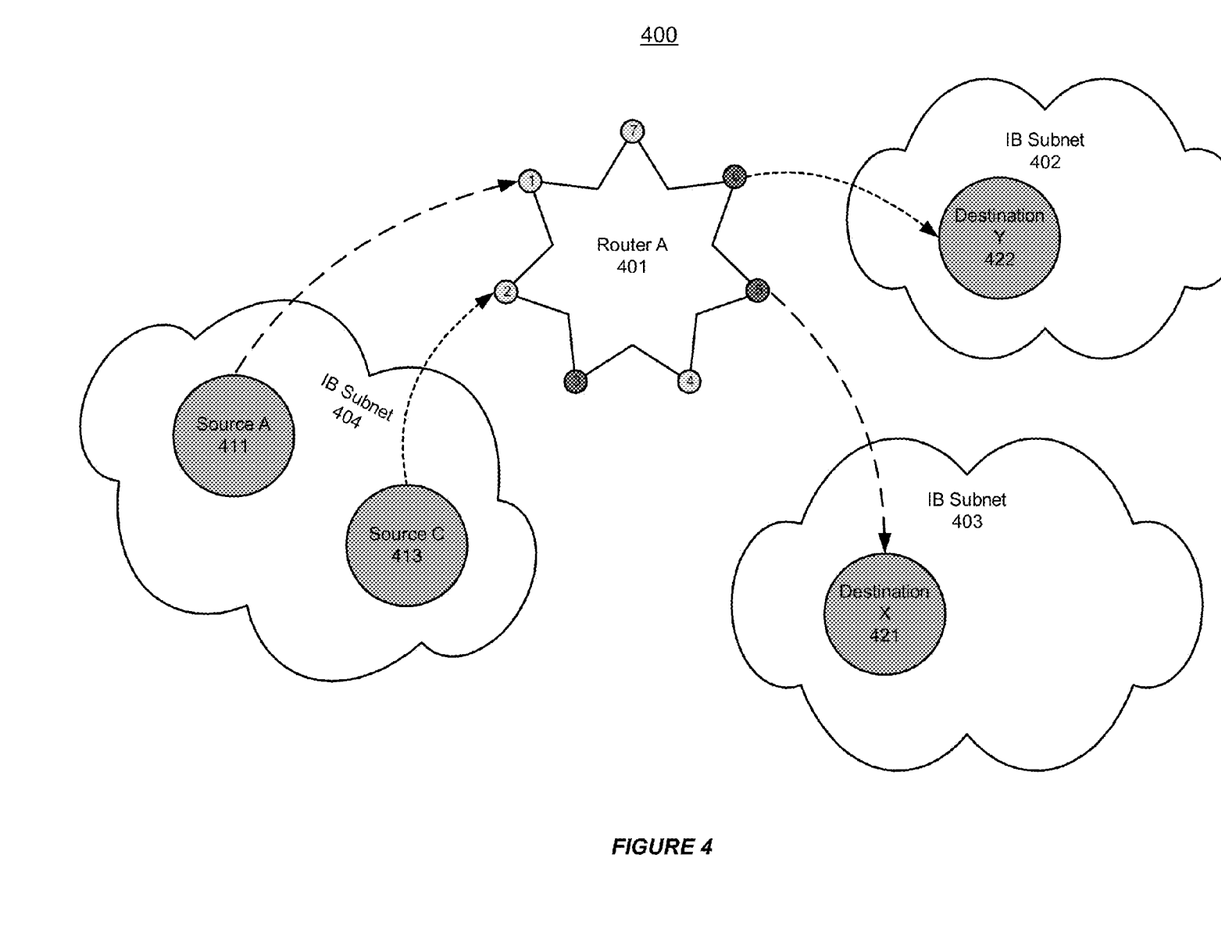
FIG. 4 shows an illustration of selecting an egress router port for a received packet at a router in a network environment, in accordance with an embodiment of the invention.

FIG. 4 shows an illustration of selecting an egress router port for a received packet at a router in a network environment, in accordance with an embodiment of the invention. As shown in FIG. 4, a network environment 400 can include a router, e.g. router A 401, which can route one or more packets to various destinations in different subnets.

For example, router A 401 can receive, at port 1, a packet from source A 411 which is destined to destination X 421 in the subnet 403. Additionally, router A 401 can receive, at port 2, another packet from source C 413, which is destined to destination Y 422 in the subnet 402.

The following Algorithm 1 can be implemented both in the SM and the router firmware for selecting an egress router port.

Algorithm 1: choose_egress_port( ) function in ISSR

```
1: if received_intersubnet_packet( ) then
2:    dstLID = get_next_LID(dGID)
3:    srand(srcLID + dstLID)
4:    port_set = choose_possible_out_ports( )
5:    e_port = port_set[(rand( )%por_set:size)]
6: end if
```

The routing decision can be based both on the source LID and the destination LID. The source LID can be either of the original source or the egress port of the previous-hop router in a transit subnet scenario, while the destination LID can be either the final destination LID or the LID of the next-hop ingress router port.

The router A 401 knows the values for both the source LID and the destination LID because it can see the subnets attached. To obtain the destination LID, a mapping function, such as the get_next_LID( ) in Algorithm 1 (line 2), can be used to map the destination GID to a destination LID or returning the next-hop LID based on the subnet prefix located in the GID is required. The mapping function can perform one or more of the following: a content-addressable memory lookup, decoding the final destination local identifier (LID) from the global routing header (GRH) field, decoding the next-hop local identifier from the global routing header (GRH) field.

In accordance with an embodiment of the invention, the algorithm selecting an egress router port can calculate a random number based on the source and destination LIDs. This random number can be used to select a single egress port from a set of possible ports. The generation of the random number can be done in a deterministic manner so that a given source-destination pair can always generate the same number. Thus, the system can prevent out of order delivery when routing between subnets and, unlike round-robin method for selecting the egress port, makes sure that each source-destination pair always uses the same path through the network.

Figure 5:
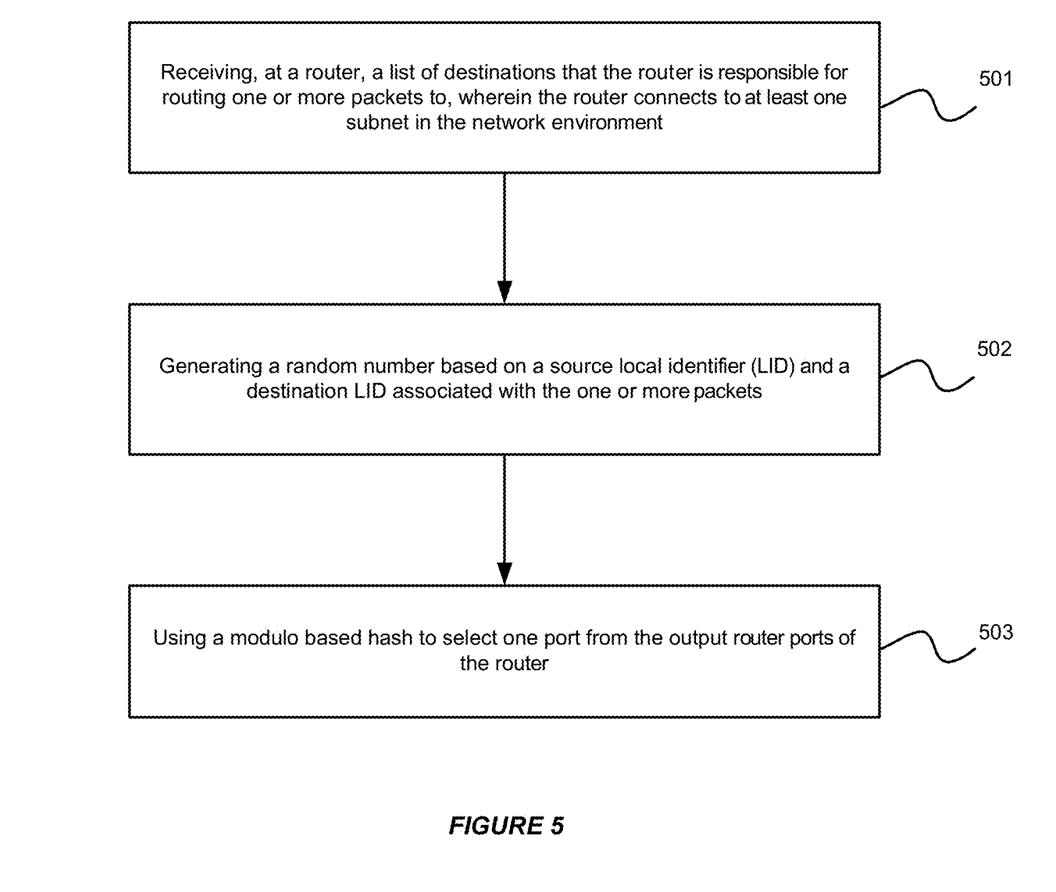
FIG. 5 illustrates an exemplary flow chart for supporting the inter-subnet source routing (ISSR) algorithm at a router in a network environment, in accordance with an embodiment of the invention.

FIG. 5 illustrates an exemplary flow chart for supporting the inter-subnet source routing (ISSR) algorithm at a router in a network environment, in accordance with an embodiment of the invention. As shown in FIG. 5, at step 501, a router can receive a list of destinations that the router is responsible for routing one or more packets to, wherein the router connects to at least one subnet in the network environment. Then, at step 502, the router can generate a random number based on a source local identifier (LID) and a destination LID associated with the one or more packets. Furthermore, at step 503, the router can use a modulo based hash to select one port from the output router ports of the router.

Inter-Subnet Fat-Tree Routing (ISFR)

In accordance with an embodiment of the invention, an optimized routing method, such as the inter-subnet fat-tree routing (ISFR) routing algorithm, can be used for routing between subnets with fat-tree topologies.

The optimized routing method can include three phases, such as a first phase of round-robin path distribution among all available router that are connected to the local subnet, a second phase that queries downward switches connected to each router to learn which switch act as the primary path towards a particular destination, and a third phase that builds a routing table using the information obtained from the first phase and the second phase.

Figure 6:
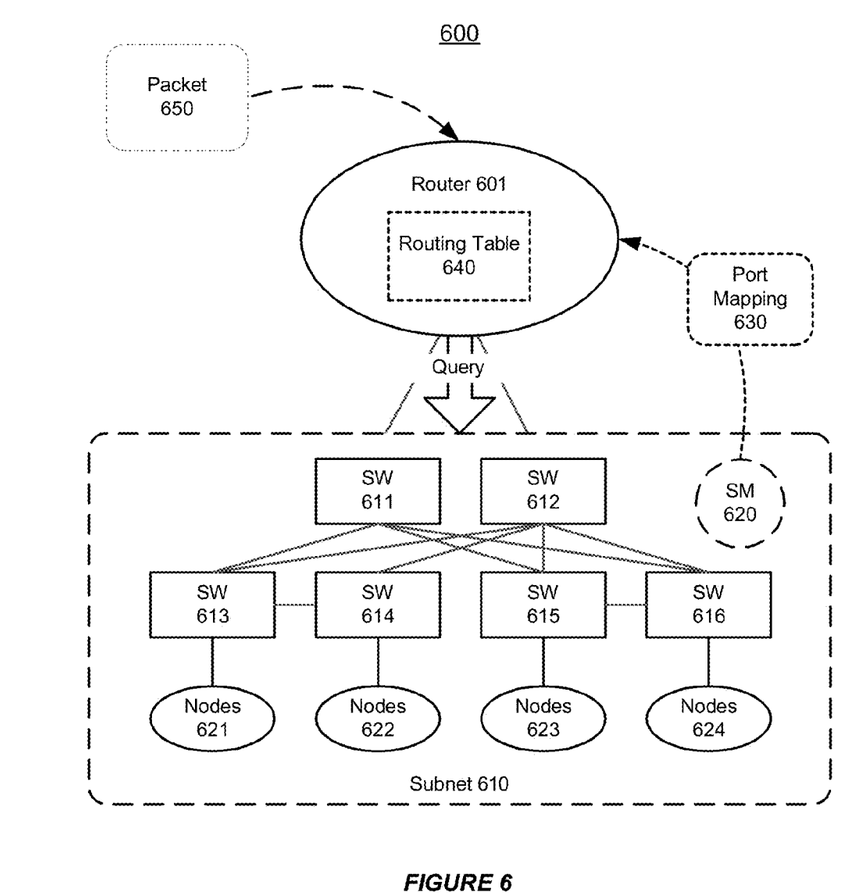
FIG. 6 shows an illustration of supporting the inter-subnet fat-tree routing (ISFR) algorithm at a router in a network environment, in accordance with an embodiment of the invention.

FIG. 6 shows an illustration of supporting the inter-subnet fat-tree routing (ISFR) algorithm at a router in a network environment 600, in accordance with an embodiment of the invention. As shown in FIG. 6, a router 601 is responsible for routing a packet 650 to a subnet 610 that connects to one or more end nodes 621-624. The subnet 610 can include one or more switches, such as SWs 611-616 in a fat-tree topology.

The router 601 is able to learn which of its ports can be used for routing packets to a particular destination accordingly to the associated GID. For example, the router 601 can receive port mappings 630 from a subnet manager (SM) 620 in a subnet 610. The port mappings 630 can include a list of destination that the router 601 is responsible for routing packets originating from the subnet 610.

Furthermore, the router 601 can learn from the switches 611-612 which downward output ports to use for achieving maximum performance when routing the packet 650. For example, the router 601 can query switches 611-612 in the subnet 610 for a primary path to a destination node in the subnet 610. The query allows the router to choose the primary path (either switch 611 or switch 612) for the Packet 650, because only one of those switches may have a dedicated primary path towards the desired destination.

Then, the router 601 can build a routing table 640 using the information obtained above. For example, the local OpenSM routing can mark the primary path to a destination node in the routing table of either switch 611 or switch 612.

The following Algorithm 2 can be implemented in the router firmware for selecting an egress port on the router.

---
Algorithm 2: query_down_for_egree_port( ) function in ISSR
---
1: if received_mapping_files then
2:     for all_port_in_down ports do
3:         down_switch = get_node(port)
4:         lid = get_LID_by_GID(GID)
5:         if down_switch:routing_table[lid] == primary_path then
6:             e_port = port
7:         end if
8:     end for
9: end The above ISFR algorithm can use the previously defined file format containing the GID-to-router port mappings in Table 1. Like the ISSR algorithm, the ISFR algorithm can be implemented in the router device. Furthermore, the ISFR algorithm may work only on fat-trees and with fat-tree routing running locally in every subnet. Also, the ISFR algorithm can fall back to ISSR if necessary.

As shown in FIG. 6, the router 601 can be represented as locating on the top of a proper fat-tree topology. Thus, after the query is performed, the router 601 can have one path per port in the downward direction for each destination located in a particular subnet. In the cases of oversubscribed fat-trees, the number of paths can be equal to the oversubscription ratio.

Additionally, there can be more than one routers connected to the subnet 610. The property of the ISFR routing is such that if all spine (top) routers were replaced with switches, the routing tables for ISFR routing (with routers) and for local routing (with switches) would be the same.

In accordance with an embodiment of the invention, the ISFR routing algorithm can be implemented based on the communication established between subnet managers (SMs) in different subnets that are connected through the non-transparent routers. For example, an interface can be provided in the routers through which the SMs can communicate, and handshaking can be implemented between two SMs located in neighboring subnets.

Figure 7:
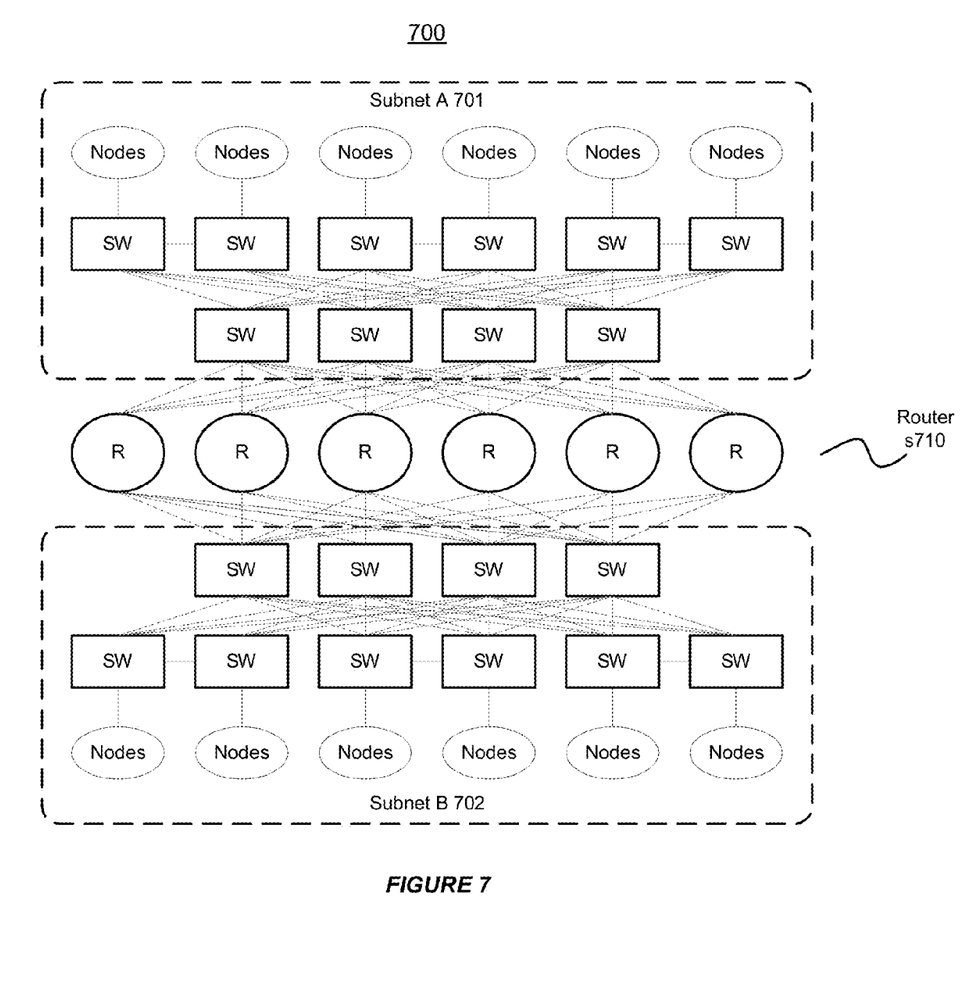
FIGS. 7-9 illustrates routing in a network environment with different topologies, in accordance with an embodiment of the invention.
Figure 8:
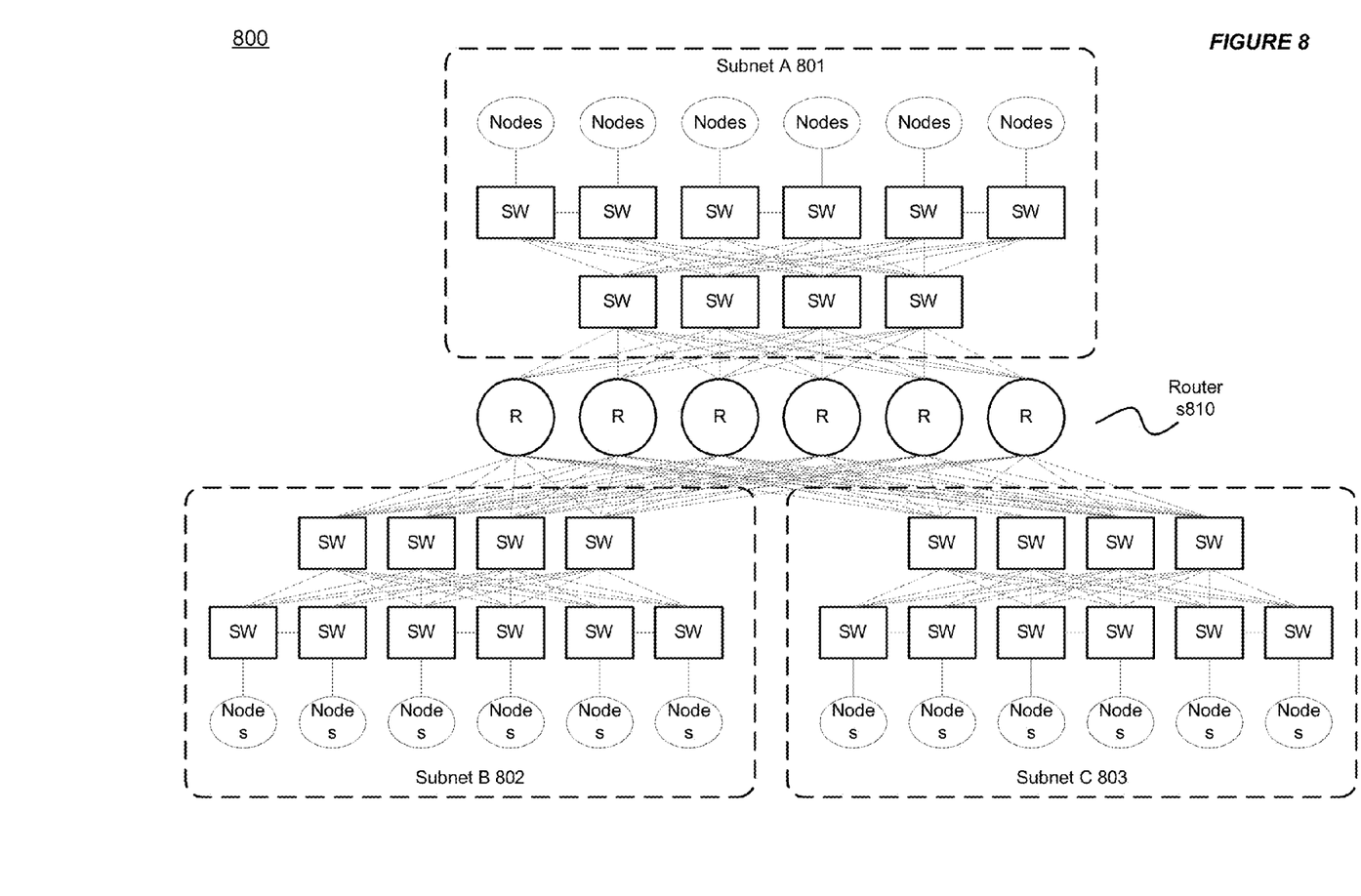
Figure 9:
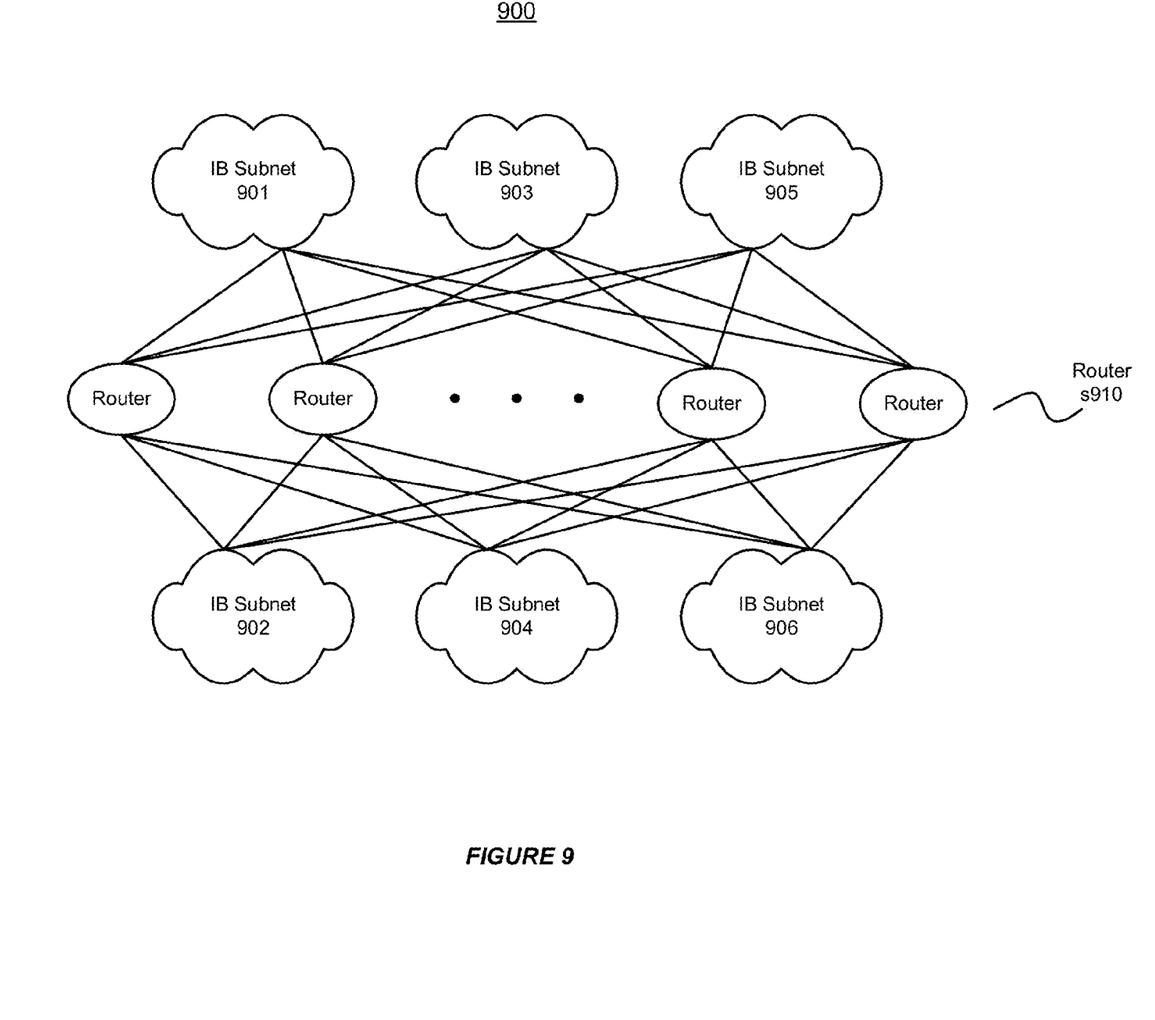

FIGS. 7-9 illustrates routing in a network environment with different topologies, in accordance with an embodiment of the invention. Each of the topologies can be represented as a multi-stage fat-tree, e.g. a three-stage fat-tree with routers placed on the top. For example, the three-stage fat-tree can have three routing/switching stages and one node stage, with each subnet (a two-stage fat-tree) appearing as a branch. Furthermore, larger topologies can also be supported based on the ISFR routing algorithm.

In accordance with an embodiment of the invention, the network environment can be configured such that each subnet is a fat-tree topology that can be directly attached to the other subnets without any transit subnets in between.

For example, in FIG. 7, the system 700 can use six routers 710 to connect two fat-tree subnets, e.g. subnets A-B 701-702. In FIG. 8, the system 800 can use six routers 810 to connect three fat-tree subnets, e.g. subnets A-C 801-803. In FIG. 9, the system 900 can create a 648-port three-stage fat-tree using eighteen routers 910 to connect six fat-tree subnets 901-906.

Figure 10:
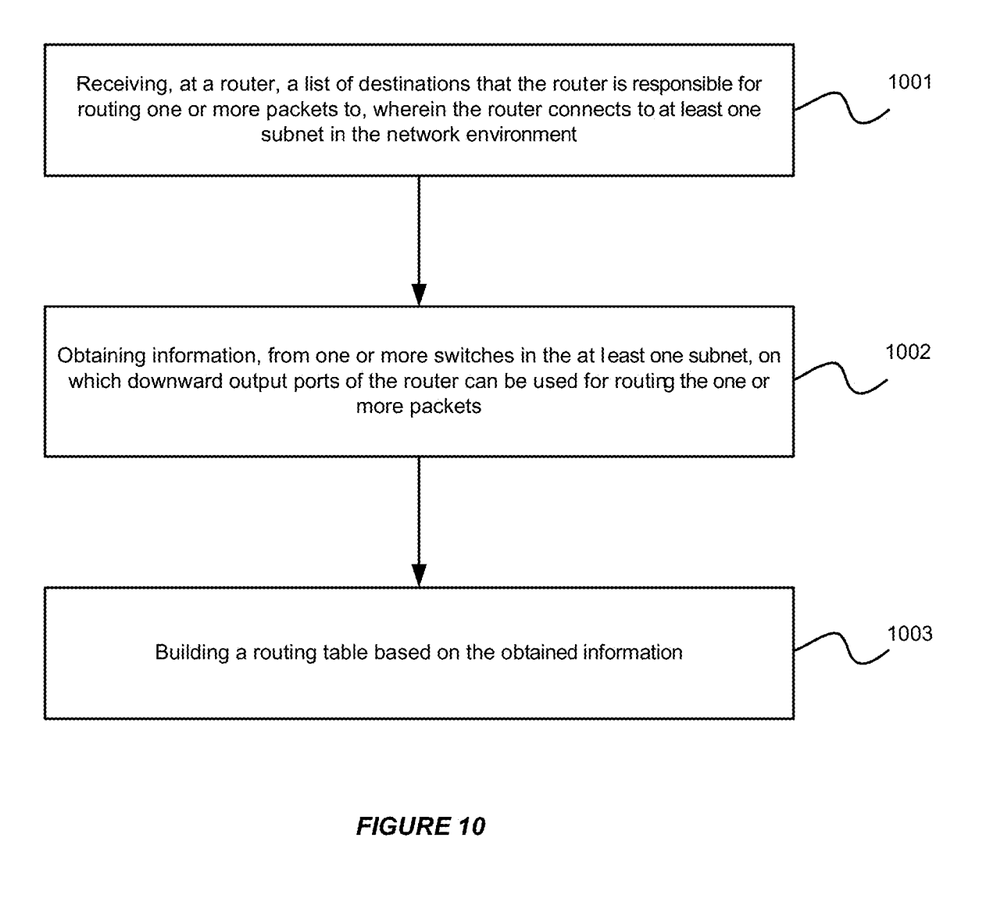
FIG. 10 illustrates an exemplary flow chart for supporting the inter-subnet fat-tree routing (ISFR) algorithm at a router in a network environment, in accordance with an embodiment of the invention.

FIG. 10 illustrates an exemplary flow chart for supporting the inter-subnet fat-tree routing (ISFR) algorithm at a router in a network environment, in accordance with an embodiment of the invention. As shown in FIG. 10, at step 1001, a router can receive a list of destinations that the router is responsible for routing one or more packets to, wherein the router connects to at least one subnet in the network environment. Then, at step 1002, the router can obtain information, from one or more switches in the at least one subnet, on which downward output ports of the router can be used for routing the one or more packets. Furthermore, at step 1003, the router can build a routing table based on the obtained information.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for routing a plurality of messages between a first plurality of nodes of a first subnet and a second plurality of nodes of a second subnet, wherein the first subnet and second subnet are directly connected by one or more routers having a plurality of ingress ports connected to the first subnet and a plurality of egress ports connected to the second subnet, the method comprising:
   routing each message of the plurality of messages by
      determining a source node from the first plurality of nodes in the first subnet by reading a source node identifier from said message,
      determining a destination node from the second plurality of nodes in the second subnet by reading a destination node identifier from said message,
      selecting an ingress port from said plurality of ingress ports on said router for receiving said message in response to said destination node identifier,
      selecting an egress port from said plurality of egress ports on said router by using said destination node identifier in combination with said source node identifier to seed a random number generator function and using output of the random number generator function to select said egress port,
      transmitting the message from said source node to said ingress port and from said egress port to said destination node; and
   whereby for each combination of source node and destination node all messages are routed through the same ingress port and egress port of said one or more routers thereby preventing out of order delivery of messages.

2. The method according to claim 1, wherein selecting an egress port from said plurality of egress ports on said router by using said destination node identifier in combination with said source node identifier to seed a random number generator function and using output of said random number generator function to select said egress port, further comprises using said output of said random number generator function in a modulo based hash function to select said egress port.

3. The method according to claim 2, further comprising:
   implementing the modulo based hash function in a router firmware.

4. The method according to claim 1, wherein selecting an ingress port from said plurality of ingress ports on said router for receiving said message in response to said destination node identifier, is performed using a port mapping file which associates said second plurality of nodes in said second subnet with said plurality of ingress ports.

5. The method according to claim 4, wherein:
   said port mapping file associates a similar number of said second plurality of nodes with each of said plurality of ingress ports.

6. The method according to claim 4, wherein:
   said port mapping file associates a similar number of said second plurality of nodes with each of said plurality of ingress ports using a round robin distribution.

7. The method according to claim 1, wherein said first subnet has a different network topology than said second subnet.

8. The method according to claim 1, wherein selecting an ingress port from said plurality of ingress ports on said router for receiving said message in response to said destination node identifier is performed using a subnet manager of said first subnet.

9. The method according to claim 1, wherein:
   selecting an ingress port from said plurality of ingress ports on said router for receiving said message in response to said destination node identifier is performed using a port mapping file which provides full granularity in selection of router ports.

10. The method according to claim 1,
    wherein one of said first subnet and second subnet has a fat-tree topology.

11. A system for routing messages comprising:
    a first subnet having a first plurality of nodes;
    a second subnet having a second plurality of nodes;
    one or more routers which directly connect said first subnet and said second subnet wherein said one or more routers have plurality of ingress ports connected to the first subnet and a plurality of egress ports connected to the second subnet;
    wherein the system is configured to route each message by
       determining a source node from the first plurality of nodes in the first subnet by reading a source node identifier from said message,
       determining a destination node from the second plurality of nodes in the second subnet by reading a destination node identifier from said message,
       selecting an ingress port from said plurality of ingress ports on said router for receiving said message in response to said destination node identifier, selecting an egress port from said plurality of egress ports on said router by using said destination node identifier in combination with said source node identifier to seed a random number generator function and using output of the random number generator function to select said egress port, transmitting the message from said source node to said ingress port and from said egress port to said destination node; and whereby for each combination of source node and destination node all messages are routed through the same ingress port and egress port of said one or more routers thereby preventing out of order delivery of messages.

12. The system of claim 11, wherein selecting an egress port from said plurality of egress ports on said router by using said destination node identifier in combination with said source node identifier to seed a random number generator function and using output of said random number generator function to select said egress port, further comprises using said output of said random number generator function in a modulo based hash function to select said egress port.

13. The system of claim 12, wherein said modulo based hash function is implemented using router firmware of said one or more router.

14. The system according to claim 11, further comprising:
a port mapping file which associates said second plurality of nodes in said second subnet with said plurality of ingress ports; and
wherein selecting an ingress port from said plurality of ingress ports on said router for receiving said message in response to said destination node identifier, is performed using said port mapping file.

15. The method according to claim 14, wherein:
said port mapping file associates a similar number of said second plurality of nodes with each of said plurality of ingress ports using a round robin distribution.

16. The method according to claim 11, wherein said first subnet has a different network topology than said second subnet.

17. The method according to claim 11, further comprising:
a subnet manager in said first subnet wherein said subnet manager selects said ingress port from said plurality of ingress ports on said router for receiving said message in response to said destination node identifier.

18. The method according to claim 11, further comprising:
a port mapping file which associates said second plurality of nodes in said second subnet with said plurality of ingress ports with full selection granularity; and
wherein selecting an ingress port from said plurality of ingress ports on said router for receiving said message in response to said destination node identifier is performed using said port mapping file.

19. The method according to claim 11, further comprising:
a port mapping file which associates said second plurality of nodes in said second subnet with said plurality of ingress ports, and said port mapping file associates a similar number of said second plurality of nodes with each of said plurality of ingress ports; and
wherein selecting an ingress port from said plurality of ingress ports on said router for receiving said message in response to said destination node identifier, is performed using said port mapping file.

20. A non-transitory computer readable medium having instructions stored thereon for supporting routing of messages between a first plurality of nodes of a first subnet and a second plurality of nodes of a second subnet wherein the first subnet and second subnet are directly connected by one or more routers having a plurality of ingress ports connected to the first subnet and a plurality of egress ports connected to the second subnet, which instructions, when executed, cause a computer to perform steps comprising:
routing each message of the plurality of messages by
determining a source node from the first plurality of nodes in the first subnet by reading a source node identifier from said message,
determining a destination node from the second plurality of nodes in the second subnet by reading a destination node identifier from said message,
selecting an ingress port from said plurality of ingress ports on said router for receiving said message in response to said destination node identifier,
selecting an egress port from said plurality of egress ports on said router by using said destination node identifier in combination with said source node identifier to seed a random number generator function and using output of the random number generator function to select said egress port,
transmitting the message from said source node to said ingress port and from said egress port to said destination node; and
whereby for each combination of source node and destination node all messages are routed through the same ingress port and egress port of said one or more routers thereby preventing out of order delivery of messages.

* * * * *